United States Patent
Shaw

(10) Patent No.: US 12,071,546 B2
(45) Date of Patent: Aug. 27, 2024

(54) COMPOSITION TO IMPROVE PERFORMANCE OF SPORTS EQUIPMENT, INCLUDING RECREATIONAL SPORTS EQUIPMENT, AND METHOD OF MANUFACTURING SAME

(71) Applicant: Christian Pearce Shaw, Santa Cruz, CA (US)

(72) Inventor: Christian Pearce Shaw, Santa Cruz, CA (US)

(73) Assignee: Treeswax Holdings LLC, Santa Cruz, CA (US)

( * ) Notice: Subject to any disclaimer, the term of this patent is extended or adjusted under 35 U.S.C. 154(b) by 387 days.

(21) Appl. No.: 17/327,078

(22) Filed: May 21, 2021

(65) Prior Publication Data

US 2022/0372294 A1  Nov. 24, 2022

(51) Int. Cl.
| | |
|---|---|
| C08L 91/06 | (2006.01) |
| B29B 7/90 | (2006.01) |
| B29B 13/04 | (2006.01) |
| B29C 39/00 | (2006.01) |
| C09D 5/16 | (2006.01) |
| C09D 191/06 | (2006.01) |
| B29K 91/00 | (2006.01) |

(52) U.S. Cl.
CPC .............. C08L 91/06 (2013.01); B29B 7/90 (2013.01); B29B 13/04 (2013.01); B29C 39/003 (2013.01); C09D 5/1656 (2013.01); C09D 191/06 (2013.01); B29K 2091/00 (2013.01); C08L 2205/025 (2013.01); C08L 2205/035 (2013.01)

(58) Field of Classification Search
CPC ....................................................... C08L 91/06
See application file for complete search history.

(56) References Cited

U.S. PATENT DOCUMENTS

| | | |
|---|---|---|
| 4,053,676 A | 10/1977 | Kaminstein |
| 4,659,498 A | 4/1987 | Stoufer |
| 4,704,225 A | 11/1987 | Stoufer |
| 4,828,885 A | 5/1989 | Rosenberg |
| 5,435,765 A | 7/1995 | Fletcher |
| 5,456,744 A | 10/1995 | Fattor |
| 5,565,023 A | 10/1996 | Sereboff |
| 5,756,204 A | 5/1998 | Ellman |

(Continued)

FOREIGN PATENT DOCUMENTS

| | | |
|---|---|---|
| AU | 2017204367 B2 | 12/2019 |
| CA | 2746174 A1 | 1/2013 |

(Continued)

OTHER PUBLICATIONS

International Search Report and Written Opinion of International application No. PCT/US22/30583 dated Sep. 28, 2022; 13 pages.

*Primary Examiner* — Dah-Wei D. Yuan
*Assistant Examiner* — Andrew J Bowman
(74) *Attorney, Agent, or Firm* — Lowenstein Sandler LLP

(57) ABSTRACT

A wax composition that improves at least one of traction or a grip of sporting equipment comprises: 1-98 wt. % of a primary wax component, wherein the primary wax component is not derived from petroleum, is not synthetic, is not derived from a mineral, is not derived from an animal, and is not derived from an annual plant; 1-40 wt. % of a softening agent; and at least one of a) above 0-40 wt. % of a tackifier or b) above 0-70 wt. % of a filler.

8 Claims, 4 Drawing Sheets

(56) References Cited

U.S. PATENT DOCUMENTS

| | | |
|---|---|---|
| 6,391,189 B1 | 5/2002 | Heinrichs |
| 7,220,158 B1 | 5/2007 | Norris |
| 8,083,064 B2 | 12/2011 | Boswell et al. |
| 8,357,236 B1 | 1/2013 | Virgillitti |
| 8,487,149 B2 | 7/2013 | Gruber et al. |
| 8,491,940 B2 | 7/2013 | Remington et al. |
| 9,555,365 B2 | 1/2017 | Eisenberger et al. |
| 10,769,700 B2 | 9/2020 | Hamilton, II et al. |
| 2006/0107870 A1* | 5/2006 | Barnes .................... C08L 91/06 |
| | | 106/272 |
| 2009/0061012 A1 | 3/2009 | Drew |
| 2010/0055331 A1 | 3/2010 | Marin |
| 2018/0030323 A1* | 2/2018 | Jaskolski ................ C08L 93/04 |

FOREIGN PATENT DOCUMENTS

| | | |
|---|---|---|
| FR | 2949231 A1 | 2/2011 |
| NZ | 575991 B2 | 2/2012 |

\* cited by examiner

COMPOSITION TO IMPROVE PERFORMANCE OF SPORTS EQUIPMENT, INCLUDING RECREATIONAL SPORTS EQUIPMENT, AND METHOD OF MANUFACTURING SAME

TECHNICAL FIELD

The present invention relates to a composition for improving the performance of sports equipment, including recreational sports equipment. Further, the present invention relates to a method of manufacturing said composition.

BACKGROUND

Since paraffin wax was first derived from petroleum in 1830, it and other petroleum derivatives, such as microcrystalline wax and petroleum jelly, have been incorporated into many different products, including compositions to coat equipment; thus improving performance for a variety of applications. Furthermore, the development of the Fischer-Tropsch process in 1925 introduced the manufacture of paraffin wax and other synthetic compounds from additional fossil fuel feedstocks including natural gas and coal, or biomass. Throughout these applications the composition can come into contact with the natural environment, the user's skin, or be shed into the natural environment, leading to various degrees of harm or irritation. The extraction, refinement, transportation, or use of petroleum or other fossil fuels is known to be contributing significantly to increasing levels of greenhouse gases in the atmosphere, the accumulation of which are accelerating global climate change; as well as contributing to various forms of aquatic or terrestrial pollution. The threats posed by global climate change and pollution have prompted consumers to demand products not directly connected to the fossil fuel industry. Though not widely adopted, certain scalable agriculture methods, for example regenerative agriculture, have the capability to increase the productivity, biodiversity, and carbon sequestration of a given area of land in comparison to conventional agriculture methods. There is a need to utilize carbon neutral or negative ingredients in everyday products at an increasing rate, while maintaining product performance, to meet the educated consumer demand.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
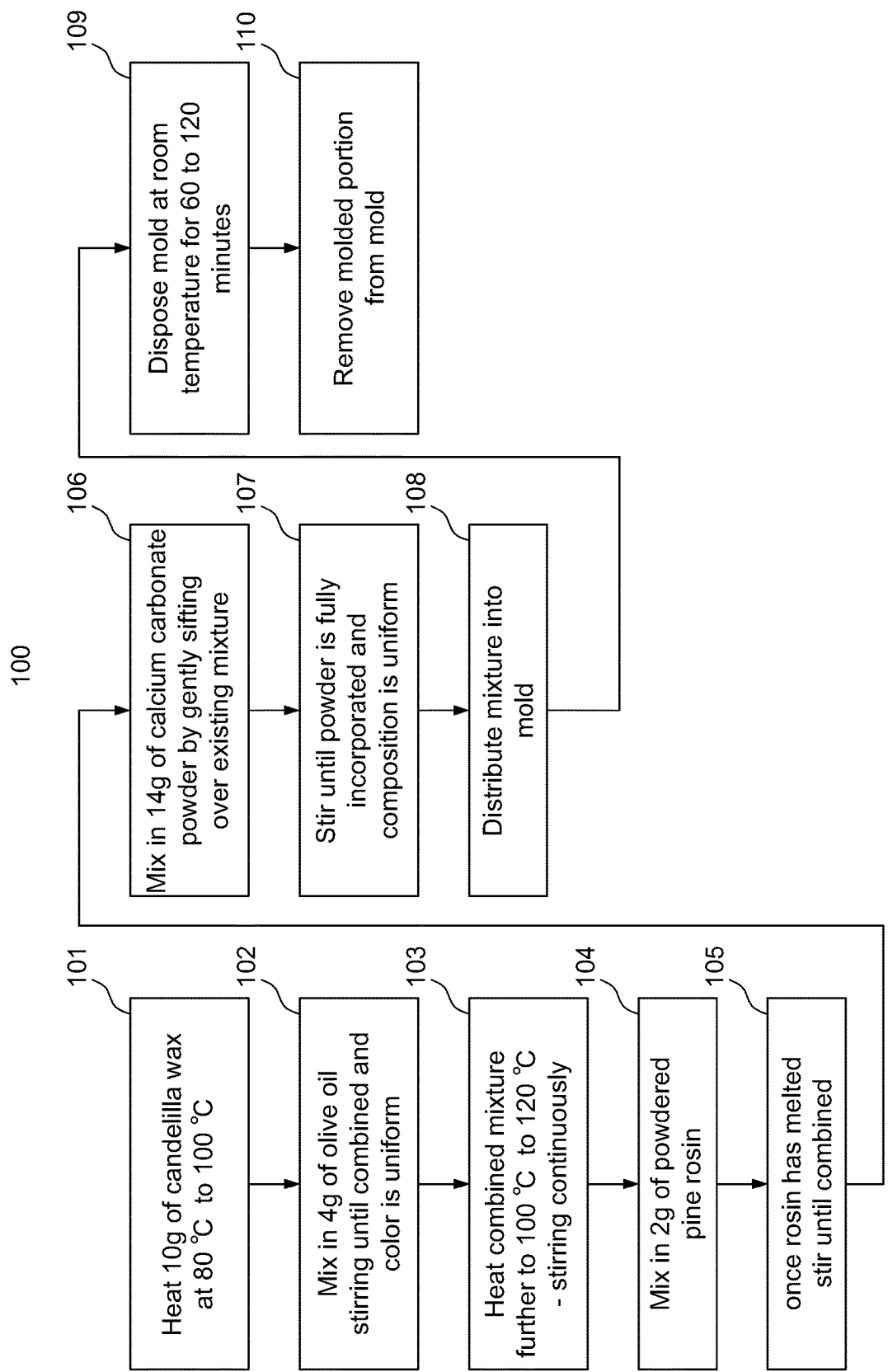
FIG. 1 is a flow chart illustrating a method of manufacturing a surfboard wax, in accordance with one embodiment of the present disclosure.

Embodiments of the present disclosure are directed to a composition to improve the performance of sporting equipment, including recreational sporting equipment. Embodiments provide a composition that improves traction, or grip, when applied in a coating onto an otherwise smooth or slippery surface. The composition may also impart hydrophobic properties to a coated surface. In at least one embodiment, said composition includes a primary wax component and softening agent, and further includes a tackifier and/or filler.

In embodiments, the primary wax component is not derived from petroleum, is not synthetic, is not derived from a mineral, is not derived from an animal, and/or is not derived from an annual plant. An annual plant may be any annual plant or plant grown as an annual crop. The primary wax component is defined as the highest percentage wax component, or cumulative percentage of components of the same genus. In one embodiment, the primary wax component is above 50% of a total wax in the composition. In an example, the primary wax component may include a combination of candelilla wax, berry wax, and carnauba wax.

The aforementioned types of ingredients (i.e., those that are derived from petroleum, synthetic, derived from minerals, derived from animals and/or derived from annual plants) are excluded from the primary wax component in embodiments due to their contribution, or potential contribution, to ecological, environmental, and/or ethical concerns. Annual plant derived wax components, such as soy wax, are excluded from the primary wax component in embodiments specifically due to the ancillary impact of some sources from chemical use or genetically modified organisms (GMO's), as well as extractive methods of land use or cultivation. Furthermore, the primary wax component is derived from perennial plants or living trees in embodiments. Independent of the specific method, cultivation of perennial plants or living trees leaves soil structure undisturbed, allowing for carbon sequestration by root biomass and soil microbes, which is an essential land use characteristic to mitigate climate change.

Conventional wax compositions used for sporting applications are commonly made from petrochemicals or other materials that raise ecological, environmental, and/or ethical concerns. These concerns are amplified by the quantity of the material consumed through standard use due to a lack of durability. The trade-off between durability and performance is a persistent challenge for the industry. At the end of life wax compositions are often discarded into the environment, further contributing to their negative impact when produced with conventional materials.

In addition to the ecological, environmental, and ethical benefits of the primary wax component over common alternatives as described herein, the skillful inclusion of said primary wax component improves durability of the resultant composition. The improved durability reduces the amount of overall material consumed by users, reducing a cost to consumers and an environmental impact of the composition as compared to other compositions used for a similar purpose. The improved composition may be used, for example, on sporting equipment such as surfboards, watercraft, hockey sticks, paddles, oars, and so on. Applications of said improved compositions include, but are not limited to, creating traction on a surfboard or other watercraft, inhibiting ice buildup or moisture penetration on a hockey stick (thus improving puck handling on the blade of the hockey stick when applied over hockey tape or directly to the blade surface), and creating grip on the otherwise smooth shaft of a kayak paddle.

In an embodiment of the present disclosure, a composition includes 1-98 wt. % of a primary wax component and 1-40 wt. % of a softening agent. The composition further includes at least one of a filler at 0-70 wt. %, a tackifier at 0-40 wt. %, and/or one or more additional wax components at 0-49 wt. %. In one example, if the primary wax component is 1% of the composition, then an additional wax component would be less than 1% of the composition. In another example, if the primary wax component is 50% of the composition, then an additional wax component would be less than 50% of the composition.

In an embodiment of the present disclosure, a composition includes a primary wax component at 5-80 wt. % and a softening agent at 1-35 wt. %. The composition further includes a filler at 1-65 wt. %, a tackifier at 1-35 wt. %, and/or one or more additional wax components at 0-40 wt. %.

In an embodiment of the present disclosure, a composition includes a primary wax component at 10-70 wt. % and a softening agent at 5-30 wt. %. The composition further includes a filler at 5-60 wt. %, a tackifier at 3-30 wt. %, and/or one or more additional wax components at 0-35 wt. %.

In an embodiment of the present disclosure, a composition includes a primary wax component at 10-60 wt. % and a softening agent at 5-25 wt. %. The composition further includes a filler at 10-60 wt. %, a tackifier at 5-25 wt. %, and/or one or more additional wax components at 0-30 wt. %.

In an embodiment of the present disclosure, a composition includes a primary wax component at 10-50 wt. % and a softening agent at 5-20 wt. %. The composition further includes a filler at 20-60 wt. %, a tackifier at 5-20 wt. %, and/or one or more additional wax components at 0-25 wt. %.

In an embodiment of the present disclosure, a composition includes a primary wax component at 15-40 wt. % and a softening agent at 8-20 wt. %. The composition further includes a filler at 30-55 wt. %, a tackifier at 6-20 wt. %, and/or one or more additional wax components at 0-25 wt. %.

In an embodiment of the present disclosure, a composition includes a primary wax component at 15-35 wt. % and a softening agent at 10-20 wt. %. The composition further includes a filler at 40-55 wt. %, a tackifier at 8-18 wt. %, and/or one or more additional wax components at 0-20 wt. %.

In an embodiment of the present disclosure, a composition includes a primary wax component at 20-30 wt. % and a softening agent at 12-18 wt. %. The composition further includes a filler at 45-55 wt. %, a tackifier at 12-16 wt. %, and/or one or more additional wax components at 0-10 wt. %.

In an embodiment of the present disclosure, a composition, in addition to a primary wax component, softening agent, tackifier and/or filler, further includes an additional wax component comprising at least one of an animal wax component at 1-49 wt. %, a mineral wax component at 1-49 wt. %, an annual plant derived wax component at 1-49 wt. %, a petroleum derived wax component at 1-49 wt. %, and/or a synthetic wax component at 1-49 wt. %. The amount of the primary wax component is greater than any combination of the animal wax component, the mineral wax component, the annual plant derived wax component, the petroleum derived wax component and/or the synthetic wax component in the composition.

In an embodiment of the present disclosure, a composition, in addition to a primary wax component, softening agent, tackifier and/or filler, further includes an additional wax component comprising at least one of an animal wax component at 1-40 wt. %, a mineral wax component at 1-40 wt. %, an annual plant derived wax component at 1-40 wt. %, a petroleum derived wax component at 1-40 wt. %, and/or a synthetic wax component at 1-40 wt. %. The amount of the primary wax component is greater than any combination of the animal wax component, the mineral wax component, the annual plant derived wax component, the petroleum derived wax component and/or the synthetic wax component in the composition.

In an embodiment of the present disclosure, a composition, in addition to a primary wax component, softening agent, tackifier and/or filler, further includes an additional wax component comprising at least one of an animal wax component at 1-30 wt. %, a mineral wax component at 1-30 wt. %, an annual plant derived wax component at 1-30 wt. %, a petroleum derived wax component at 1-30 wt. %, and/or a synthetic wax component at 1-30 wt. %. The amount of the primary wax component is greater than any combination of the animal wax component, the mineral wax component, the annual plant derived wax component, the petroleum derived wax component and/or the synthetic wax component in the composition.

In an embodiment of the present disclosure, a composition, in addition to a primary wax component, softening agent, tackifier and/or filler, further includes an additional wax component comprising at least one of an animal wax component at 1-20 wt. %, a mineral wax component at 1-20 wt. %, an annual plant derived wax component at 1-20 wt. %, a petroleum derived wax component at 1-20 wt. %, and/or a synthetic wax component at 1-20 wt. %. The amount of the primary wax component is greater than any combination of the animal wax component, the mineral wax component, the annual plant derived wax component, the petroleum derived wax component and/or the synthetic wax component in the composition.

In an embodiment of the present disclosure, a composition, in addition to a primary wax component, softening agent, tackifier and/or filler, further includes an additional wax component comprising at least one of an animal wax component at 1-10 wt. %, a mineral wax component at 1-10 wt. %, an annual plant derived wax component at 1-10 wt. %, a petroleum derived wax component at 1-10 wt. %, and/or a synthetic wax component at 1-10 wt. %. The amount of the primary wax component is greater than any combination of the animal wax component, the mineral wax component, the annual plant derived wax component, the petroleum derived wax component and/or the synthetic wax component in the composition.

In an embodiment of the present disclosure, a composition, in addition to a primary wax component, softening agent, tackifier and/or filler, further includes an additional wax component comprising at least one of an animal wax component at 1-5 wt. %, a mineral wax component at 1-5 wt. %, an annual plant derived wax component at 1-5 wt. %, a petroleum derived wax component at 1-5 wt. %, and/or a synthetic wax component at 1-5 wt. %. The amount of the primary wax component is greater than any combination of the animal wax component, the mineral wax component, the annual plant derived wax component, the petroleum derived wax component and/or the synthetic wax component in the composition.

In an embodiment of the present disclosure, a composition, in addition to a primary wax component, softening agent, tackifier and/or filler, further includes an additional wax component comprising at least one of an animal wax component at 1-2 wt. %, a mineral wax component at 1-2 wt. %, an annual plant derived wax component at 1-2 wt. %, a petroleum derived wax component at 1-2 wt. %, and/or a synthetic wax component at 1-2 wt. %. The amount of the primary wax component is greater than any combination of the animal wax component, the mineral wax component, the annual plant derived wax component, the petroleum derived wax component and/or the synthetic wax component in the composition.

In an embodiment of the present disclosure, the composition includes a softening agent, wherein the softening agent is derived from perennial plants or living trees. In embodiments, the softening agent derived from a living tree is a softening agent that is harvested or obtained without destroying or displacing a living tree. Some examples of softening agents that may be used include but are not limited to an oil such as olive oil, jojoba oil, babassu oil, turpentine oil, and coconut oil.

In an embodiment of the present disclosure, the composition includes a tackifier, where the tackifier is derived from perennial plants or living trees. Examples of tackifiers that may be used include but are not limited to pine rosin or resin, damar rosin or resin, and benzoin gum resin or rosin.

In an embodiment of the present disclosure, the composition includes a filler, where the filler may be a mineral filler. Examples of fillers that may be used include but are not limited to calcium carbonate powder and clay.

In one embodiment, the composition is used for application to the deck of a water sport craft. The composition may provide enhanced traction to the deck. Examples of watercraft to which the composition may be applied includes but is not limited to a surfboard, a kiteboard, a hydrofoil surfing board, a windsurfing board, or a stand up paddle board. In at least one embodiment, the composition used for watercraft such as surfboards to create or enhance traction is composed of candelilla wax, olive oil, pine rosin and/or resin, and calcium carbonate powder, combined at ratios dependent on the desired characteristics, or environmental determinants such as water temperature, ambient air temperature, or any combination of the aforementioned. In such embodiments candelilla wax is selected due to its high hydrocarbon content when compared with similarly sourced waxes.

In an embodiment of the present disclosure, a composition includes a primary wax component comprising candelilla wax at 10-25 wt. %, and an additional wax component comprising beeswax at 0-10 wt. %, microcrystalline wax at 0-10 wt. %, paraffin wax at 0-10 wt. %, soy wax at 0-10 wt. %, stearic acid at 0-10 wt. %, ceresin at 0-10%, synthetic wax at 0-10 wt. %, lanolin at 0-10 wt. %, sunflower wax at 0-10 wt. %, and 0-10 wt. % rice bran wax, olive oil at 5-25 wt. %, pine rosin at 5-25 wt. %; and calcium carbonate powder at 20-60 wt. %.

In an embodiment of the present disclosure, a composition includes a primary wax component comprising candelilla wax at about 18 wt. %, and an additional wax component comprising beeswax at about 2 wt. %, microcrystalline wax at about 5 wt. %, and rice bran wax at about 5 wt. %, olive oil at about 16 wt. %, pine rosin at about 14 wt. %, and calcium carbonate powder at about 40 wt. %.

In an embodiment of the present disclosure, a composition includes a primary wax component comprising candelilla wax at 5-25 wt. %, myrica fruit wax at 0-10 wt. %, berry wax at 0-10 wt. %, bayberry wax at 0-10 wt. %, japan wax at 0-10 wt. %, carnauba wax at 0-10 wt. %, esparto wax at 0-10 wt. %, and jojoba wax at 0-10 wt. %, and an additional wax component comprising beeswax at 0-10 wt. %, microcrystalline wax at 0-10 wt. %, paraffin wax at 0-10 wt. %, soy wax at 0-10 wt. %, stearic acid at 0-10 wt. %, ceresin at 0-10 wt. %, synthetic wax at 0-10 wt. %, lanolin at 0-10 wt. %, sunflower wax at 0-10 wt. %, and rice bran wax at 0-10 wt. %, a softening agent comprising jojoba oil at 0-10 wt. %, grapeseed oil at 0-10 wt. %, castor bean oil at 0-10 wt. %, coconut oil at 0-10 wt. %, fractionated coconut oil (mct oil) at 0-10 wt. %, babassu oil at 0-10 wt. %, turpentine oil at 0-10 wt. %, and olive oil at 5-25 wt. %, a tackifier comprising pine rosin at 5-25 wt. %, benzoin gum rosin at 0-10 wt. %, and damar rosin at 0-10 wt. %, and a filler comprising clay at 0-10 wt. %, and calcium carbonate powder at 20-60 wt. %.

In an embodiment of the present disclosure, a composition includes a primary wax component comprising candelilla wax at 5-25 wt. %, myrica fruit wax at 0-5 wt. %, berry wax at 0-5 wt. %, bayberry wax at 0-5 wt. %, japan wax at 0-5 wt. %, carnauba wax at 0-5 wt. %, esparto wax at 0-5 wt. %, and jojoba wax at 0-5 wt. %, and an additional wax component comprising beeswax at 0-5 wt. %, microcrystalline wax at 0-5 wt. %, paraffin wax at 0-5 wt. %, soy wax at 0-5 wt. %, stearic acid at 0-5 wt. %, ceresin at 0-5 wt. %, synthetic wax at 0-5 wt. %, lanolin at 0-5 wt. %, sunflower wax at 0-5 wt. %, and rice bran wax at 0-5 wt. %, a softening agent comprising jojoba oil at 0-5 wt. %, grapeseed oil at 0-5 wt. %, castor bean oil at 0-5 wt. %, coconut oil at 0-5 wt. %, fractionated coconut oil (mct oil) at 0-5 wt. %, babassu oil at 0-5 wt. %, turpentine oil at 0-5 wt. %, and olive oil at 5-25 wt. %, a tackifier comprising pine rosin at 5-25 wt. %, benzoin gum rosin at 0-5 wt. %, and damar rosin at 0-5 wt. %, and a filler comprising clay at 0-5 wt. % and calcium carbonate powder at 20-60 wt. %.

In an embodiment of the present disclosure, a composition includes a primary wax component comprising candelilla wax at 5-25 wt. % and at least one of myrica fruit wax at 1-10 wt. %, berry wax at 1-10 wt. %, bayberry wax at 1-10 wt. %, japan wax at 1-10 wt. %, carnauba wax at 1-10 wt. %, esparto wax at 1-10 wt. %, or jojoba wax at 1-10 wt. %. In an embodiment, the composition further includes an additional wax component comprising at least one of beeswax at 1-10 wt. %, microcrystalline wax at 1-10 wt. %, paraffin wax at 1-10 wt. %, soy wax at 1-10 wt. %, stearic acid at 1-10 wt. %, ceresin at 1-10 wt. %, synthetic wax at 1-10 wt. %, lanolin at 1-10 wt. %, sunflower wax at 1-10 wt. %, or rice bran wax at 1-10 wt. %. In an embodiment, the composition further includes olive oil at 5-25 wt. % and at least one of jojoba oil at 1-10 wt. %, grapeseed oil at 1-10 wt. %, castor bean oil at 1-10 wt. %, coconut oil at 1-10 wt. %, fractionated coconut oil (mct oil) at 1-10 wt. %, babassu oil at 1-10 wt. %, or turpentine oil at 1-10 wt. %. In an embodiment, the composition further includes pine rosin at 5-25 wt. % and at least one of benzoin gum rosin at 1-10 wt. %, damar rosin at 1-10 wt. %, or clay at 1-10 wt. %. In an embodiment, the composition further includes calcium carbonate powder at 20-60 wt. %.

In an embodiment of the present disclosure, a composition includes a primary wax component comprising candelilla wax at 5-25 wt. % and at least one of myrica fruit wax at 1-5 wt. %, berry wax at 1-5 wt. %, bayberry wax at 1-5 wt. %, japan wax at 1-5 wt. %, carnauba wax at 1-5 wt. %, esparto wax at 1-5 wt. %, or jojoba wax at 1-5 wt. %. In an embodiment, the composition further includes an additional wax component comprising at least one of beeswax at 1-5 wt. %, microcrystalline wax at 1-5 wt. %, paraffin wax at 1-5 wt. %, soy wax at 1-5 wt. %, stearic acid at 1-5 wt. %, ceresin at 1-5 wt. %, synthetic wax at 1-5 wt. %, lanolin at 1-5 wt. %, sunflower wax at 1-5 wt. %, or rice bran wax at 1-5 wt. %. In an embodiment, the composition further includes olive oil at 5-25 wt. % and at least one of jojoba oil at 1-5 wt. %, grapeseed oil at 1-5 wt. %, castor bean oil at 1-5 wt. %, coconut oil at 1-5 wt. %, fractionated coconut oil (mct oil) at 1-5 wt. %, babassu oil at 1-5 wt. %, or turpentine oil at 1-5 wt. %. In an embodiment, the composition further includes pine rosin at 5-25 wt. % and at least one of benzoin gum rosin at 1-5 wt. %, damar rosin at 1-5 wt. %, or clay at 1-5 wt. %. In an embodiment, the composition further includes calcium carbonate powder at 20-60 wt. %.

In an embodiment of the present disclosure, a composition includes a primary wax component comprising candelilla wax at 5-25 wt. % and at least one of myrica fruit wax at 2-4 wt. %, berry wax at 2-4 wt. %, bayberry wax at 2-4 wt. %, japan wax at 2-4 wt. %, carnauba wax at 2-4 wt. %, esparto wax at 2-4 wt. %, or jojoba wax at 2-4 wt. %. In an embodiment, the composition further includes an additional wax component comprising at least one of beeswax at 2-4 wt. %, microcrystalline wax at 2-4 wt. %, paraffin wax at 2-4 wt. %, soy wax at 2-4 wt. %, stearic acid at 2-4 wt. %, ceresin at 2-4 wt. %, synthetic wax at 2-4 wt. %, lanolin at 2-4 wt. %, sunflower wax at 2-4 wt. %, or rice bran wax at 2-4 wt. %. In an embodiment, the composition further includes olive oil at 5-25 wt. % and at least one of jojoba oil at 2-4 wt. %, grapeseed oil at 2-4 wt. %, castor bean oil at 2-4 wt. %, coconut oil at 2-4 wt. %, fractionated coconut oil (e.g., medium-chain triglyceride (mct) oil) at 2-4 wt. %, babassu oil at 2-4 wt. %, or turpentine oil at 2-4 wt. %. In an embodiment, the composition further includes pine rosin at 5-25 wt. % and at least one of benzoin gum rosin at 2-4 wt. %, damar rosin at 2-4 wt. %, or clay at 2-4 wt. %. In an embodiment, the composition further includes calcium carbonate powder at 20-60 wt. %.

In an embodiment of the present disclosure, a composition includes a primary wax component comprising candelilla wax at about 8 wt. %, berry wax at about 6 wt. %, and carnauba wax at about 4 wt. %, and an additional wax component comprising beeswax at about 2 wt. %, microcrystalline wax at about 5 wt. %, and rice bran wax at about 5 wt. %, olive oil at about 16 wt. %, pine rosin at about 14 wt. %, and calcium carbonate powder at about 40 wt. %.

In an embodiment of the present disclosure for application to the deck of a watercraft a composition includes candelilla wax at 10-45 wt. %, olive oil at 5-30 wt. %, pine rosin at 3-35 wt. %, and calcium carbonate powder at 30-60 wt. %.

In an embodiment of the present disclosure for application to the deck of a watercraft a composition includes candelilla wax at 15-40 wt. %, olive oil at 10-20 wt. %, pine rosin at 4-30 wt. %, and calcium carbonate powder at 35-55 wt. %.

In an embodiment of the present disclosure for application to the deck of a watercraft a composition includes candelilla wax at 20-40 wt. %, olive oil at 12-18 wt. %, pine rosin at 5-25 wt. %, and calcium carbonate powder at 40-55 wt. %.

In an embodiment of the present disclosure for application to the deck of a watercraft a composition includes candelilla wax at 25-35 wt. %, olive oil at 13-16 wt. %, pine rosin at 6-20 wt. %, and calcium carbonate powder at 40-50 wt. %.

In an embodiment of the present disclosure for application to the deck of a watercraft a composition includes candelilla wax at 30-35 wt. %, olive oil at 13-14 wt. %, pine rosin at 6-15 wt. %, and calcium carbonate powder at 45-50 wt. %.

In an embodiment of the present disclosure for application to the deck of a watercraft a composition includes candelilla wax at 33.3 wt. %, olive oil at 13.3 wt. %, pine rosin at 6.7 wt %, and calcium carbonate powder at 46.7 wt. %.

An embodiment of the present disclosure for application to the deck of a surfboard to improve traction for use in warm water (water having a temperature of 20° C. to 30° C.) comprises about 33.3 wt. % wax component, about 13.3 wt. % softening agent, about 6.7 wt. % tackifier, and about 46.7 wt. % filler. An about 30 g molded portion of said composition may be manufactured by method 100 referring to FIG. 1. Other compositions described herein may also be manufactured according to FIG. 1 but using different specific ingredients and amounts than those disclosed with reference to FIG. 1. FIG. 1 is a flow chart illustrating a method of manufacturing a board wax (e.g., a surfboard wax), in accordance with an embodiment of the present disclosure. The method 100 includes heating about 10 g of candelilla wax from about 80° C. to about 100° C., at Standard Temperature and Pressure (STP), in a container, as disclosed in operational block 101. Then about 4 g of olive oil is mixed in and stirred with the heated wax until combined, evidenced by uniform color, as disclosed in operational block 102. The combined mixture is heated further from about 100° C. to about 120° C. while stirring continuously, as disclosed in operational block 103. Next, about 2 g of powdered pine rosin is mixed in, as disclosed in operational block 104. Once the solid rosin powder has melted, becoming translucent, the mixture is stirred until combined, and the color is uniform, as disclosed in operational block 105. Then, about 14 g of calcium carbonate powder is mixed in, said powder being substantially uniform in nature to prevent the inclusion of clumps, such as achieved by gently sifting over the existing mixture, as disclosed in operational block 106. The mixture is then stirred until the calcium carbonate powder is fully incorporated, and the mixture is uniform in color and texture, as disclosed in operational block 107. The mixture is then poured into a mold, as disclosed in operational block 108. In one embodiment, a flat, conductive surface is used beneath the mold to ensure mold shape is maintained and the mixture cools evenly. Then, the mold is disposed at room temperature for a duration of about 60 to about 120 minutes, as disclosed in operational block 109. Finally, the molded portion is removed from the mold, as disclosed in operational block 110. The about 30 g molded portion is now ready for use.

Figure 2:
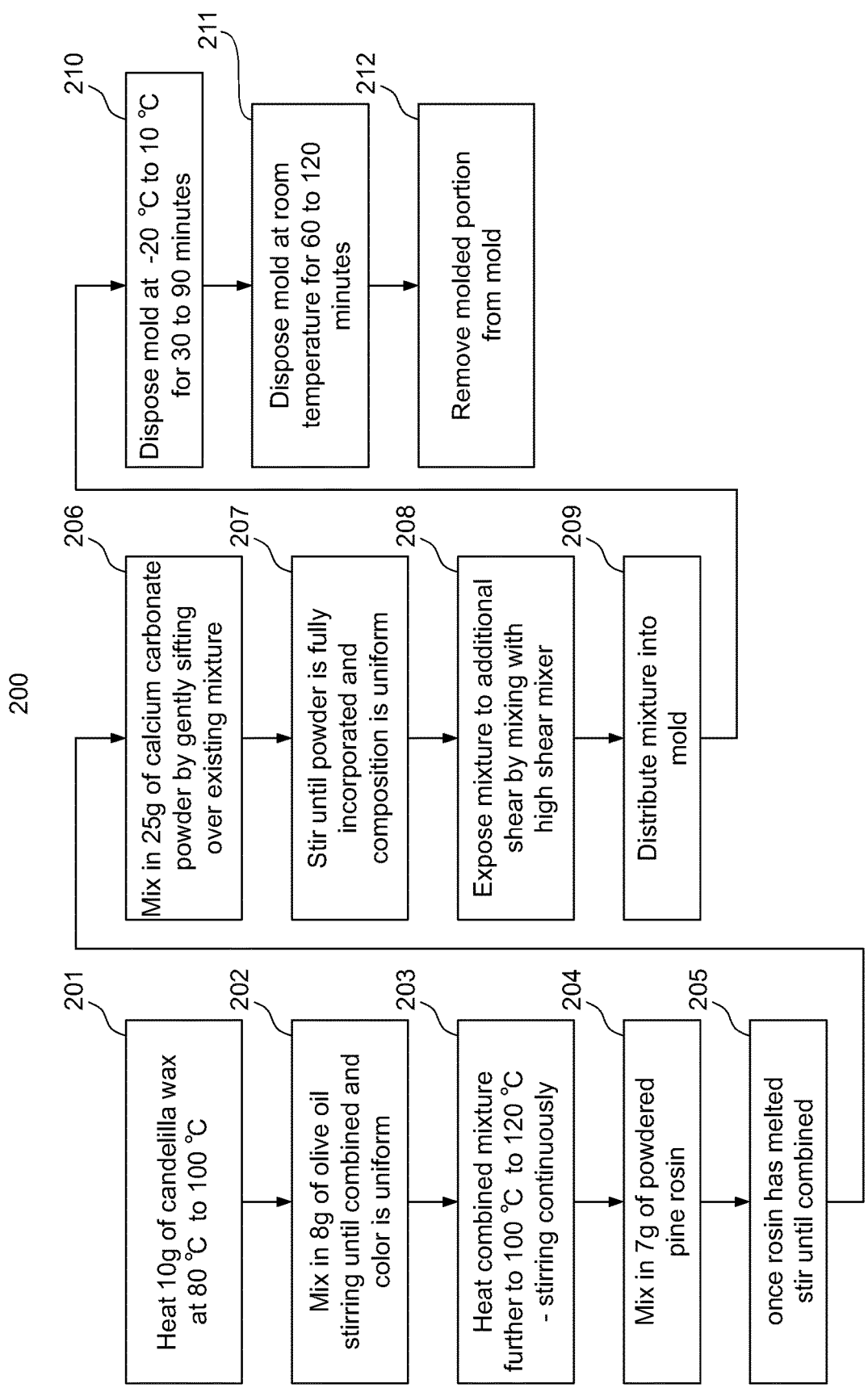
FIG. 2 is a flow chart illustrating a method of manufacturing a surfboard wax, in accordance with one embodiment of the present disclosure.

An embodiment of the present disclosure for application to the deck of a surfboard to improve traction for use in cool water (water having a temperature of 10° C. to 20° C.) comprises about 20 wt. % wax component, about 16 wt. % softening agent, about 14 wt. % tackifier, and about 50 wt. % filler. An about 50 g molded portion of said composition, as prepared for application, is manufactured by a method 200 referring to FIG. 2. Other compositions described herein may also be manufactured according to FIG. 2 but using different specific ingredients and amounts than those disclosed with reference to FIG. 2. FIG. 2 is a flow chart illustrating a method of manufacturing a board wax, in accordance with an embodiment of the present disclosure. The method 200 includes heating about 10 g of candelilla wax from about 80° C. to about 100° C., at STP, in a container, as disclosed in operational block 201. Then about 8 g of olive oil is mixed in and stirred with the heated wax until combined, evidenced by uniform color, as disclosed in operational block 202. The combined mixture is heated further from about 100° C. to about 120° C. while stirring continuously, as disclosed in operational block 203. Next, about 7 g of powdered pine rosin is mixed in, as disclosed in operational block 204. Once the solid rosin powder has melted, becoming translucent, the mixture is stirred until combined, and the color is uniform, as disclosed in operational block 205. Then, mix in about 25 g of calcium carbonate powder, said powder being substantially uniform in nature to prevent the inclusion of clumps, such as achieved by gently sifting over the existing mixture, as disclosed in operational block 206. The mixture is then stirred until powder is fully incorporated, and the mixture is uniform in color and texture, as disclosed in operational block 207. The mixture is then exposed to additional shear by mixing with a high shear mixer 208. Shear stress in liquids is a result of velocity differences between fluid layers moving adjacent to one another and can be measured in Pascals (Pa). This additional stress can alter the consistency to produce the desired performance characteristics in the resultant composition for use in cool water, such as improved spreadability and tack. These characteristics are diminished by the hardening effect of cool water on standard waxes. One example of a high shear mixer is the Model CJ-4AD by Arde Barinco Inc. and operates from about 150-300 Pa. High shear mixers can reach peak shear stress between about 1200-1500 Pa. The mixture is then poured into a mold, as disclosed in operational block 209. In one embodiment, a flat, conductive surface is preferred beneath the mold to ensure mold shape is maintained and the mixture cools evenly. Then, the mold is disposed from about −20° C. to about 10° C. for about 30 to about 90 minutes, as disclosed in operational block 210. The rate of cooling achieved by disposition of the mold from about −20° C. to about 10° C. as opposed to room temperature is integral to the formation of the desired composition as the rapid cooling rate results in decreased crystal length, increased fractal dimension of the crystal network, and a decreased network pore area fraction, resulting in an increased oil binding capacity which translates to an increase in plasticity, a desired characteristic for use in cool water as lower temperature water hardens the wax, making it more difficult to apply and less effective for traction. Then, the mold is disposed at room temperature for about 60 to about 120 minutes, as disclosed in operational block 211. Finally, the molded portion is removed from the mold, as disclosed in operational block 212. The about 50 g molded portion is now ready for use.

Figure 3:
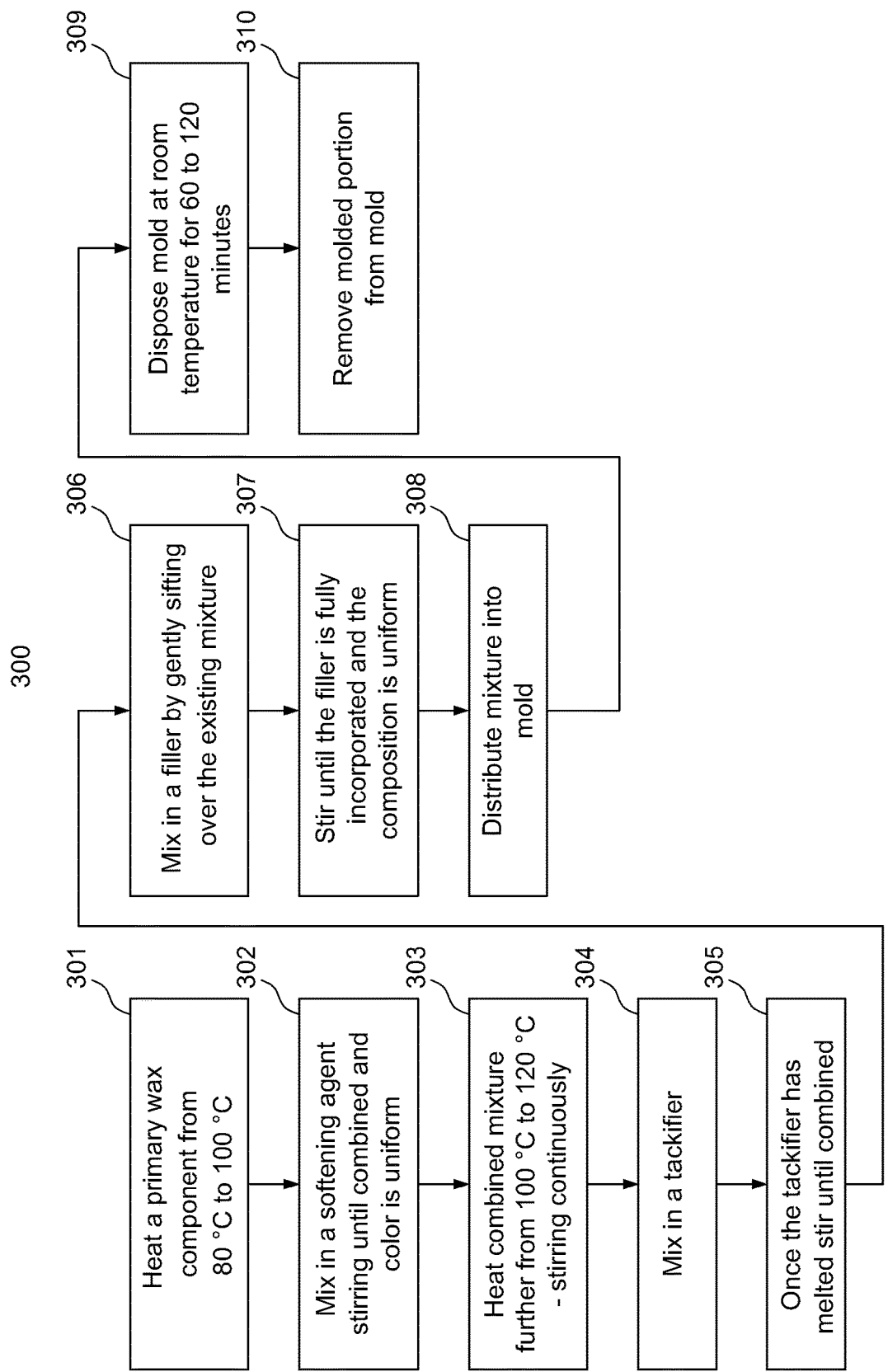
FIG. 3 is a flow chart illustrating a method of manufacturing a wax composition for use on sporting equipment, in accordance with one embodiment of the present disclosure.

A molded portion of the disclosed composition may be manufactured by method 300 referring to FIG. 3. FIG. 3 is a flow chart illustrating a method 300 of manufacturing a board wax, in accordance with embodiments of the present disclosure. The method 300 includes heating a primary wax component, which can be any of the previously mentioned primary wax components, from 80° C. to 100° C., at Standard Temperature and Pressure (STP), in a container, as disclosed in operational block 301. Then a softening agent, which can be any of the previously mentioned softening agents, is mixed in and stirred with the heated wax until combined, evidenced by uniform color, as disclosed in operational block 302. The combined mixture is heated further from 100° C. to 120° C. while stirring continuously, as disclosed in operational block 303.

Next, a tackifier, which can be any of the previously mentioned tackifiers, is mixed in, as disclosed in operational block 304. Once the tackifier has melted, the mixture is stirred until combined, and the color is uniform, as disclosed in operational block 305. Then, a filler, which can be any of the previously mentioned fillers, is mixed in, said filler being substantially uniform in nature to prevent the inclusion of clumps, such as achieved by gently sifting over the existing mixture, as disclosed in operational block 306. The mixture is then stirred until the filler is fully incorporated, and the mixture is uniform in color and texture, as disclosed in operational block 307. The mixture is then poured into a mold, as disclosed in operational block 308. In one embodiment, a flat, conductive surface is used beneath the mold to ensure mold shape is maintained and the mixture cools evenly. Then, the mold is disposed at room temperature for a duration of 60 to 120 minutes, as disclosed in operational block 309. Finally, the molded portion is removed from the mold, as disclosed in operational block 310. The molded portion is now ready for use.

Figure 4:
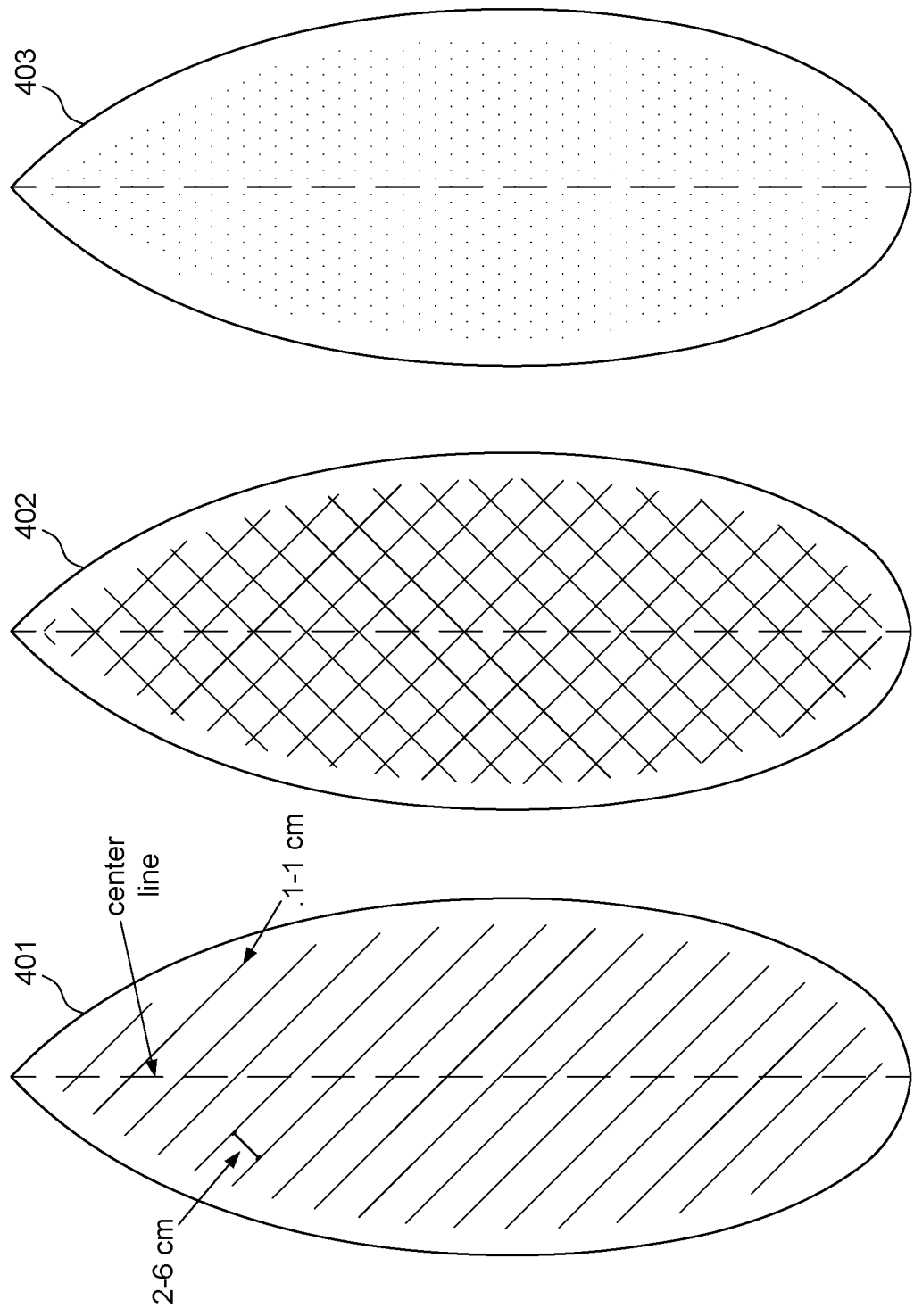
FIG. 4 depicts a preferred method of application to the deck of a surfboard in accordance with one embodiment of the present disclosure.

FIG. 4 illustrates an application technique for a composition onto a surfboard, in accordance with an embodiment of the present disclosure. Due to the improved durability of the composition over existing alternatives, one possible method of application to the deck of a surfboard for optimal performance, using a molded portion, is as follows with reference to FIG. 4. Using an edge of the molded portion, deposit one layer of material that is about 0.1 to about 1.0 centimeter in width in a straight line crossing diagonally from one border of the deck to the other. The layer may be deposited by rubbing the molded portion across the surfboard. The previous step may be repeated to deposit parallel layers of material at a spacing of about 2-6 centimeters until the entire deck is covered 401. The previous process may be repeated at the same angle to the centerline as seen in 401, but in an opposite direction, until the entire deck has been covered 402. Subsequently, or alternatively, a user may apply the largest flat surface of the molded portion onto the surfboard using light pressure and a circular motion to deposit material over the entire deck with about 5 cm to about 10 cm diameter circles, periodically alternating the direction of rotation until the coating has accumulated to about 0.1 mm-5.0 mm in thickness, indicating the texture 403.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A wax composition that improves at least one of traction or a grip of sporting equipment, comprising:
   a primary wax component, wherein the primary wax component is not derived from petroleum, is not synthetic, is not derived from a mineral, is not derived from an animal, and is not derived from an annual plant, the primary wax component comprising about 18 wt. % candelilla wax;
   an additional wax component comprising about 2 wt. % beeswax, about 5 wt. % microcrystalline wax, and about 5 wt. % rice bran wax;
   a softening agent comprising about 16 wt. % olive oil;
   a tackifier comprising about 14 wt. % pine rosin; and
   a filler comprising about 40 wt. % carbonate powder.

2. The wax composition of claim 1, wherein at least a portion of said primary wax component is derived from a perennial plant or a living tree.

3. The wax composition of claim 1, wherein said primary wax component comprises a derivative of candelilla wax.

4. The wax composition of claim 1, wherein at least a portion of said softening agent is derived from a perennial plant or a living tree.

5. The wax composition of claim 1, wherein at least a portion of said tackifier is derived from a perennial plant or a living tree.

6. The wax composition of claim 1, wherein at least a portion of said primary wax component and at least a portion of said softening agent are derived from perennial plants or living trees, and wherein at least a portion of said tackifier comprises a resin or rosin derived from perennial plants or living trees.

7. The wax composition of claim 1, wherein the composition is applied to a handle or shaft of a paddle and provides an improved grip to the handle or shaft of the paddle.

8. The wax composition of claim 1, wherein the composition is applied to a blade of an ice hockey stick and prevents a buildup of ice on the ice hockey stick and provides an improved grip of the hockey stick.

* * * * *